United States Patent
Schwekutsch et al.

(10) Patent No.: US 8,661,942 B2
(45) Date of Patent: Mar. 4, 2014

(54) ANGLE DRIVE ASSEMBLY

(75) Inventors: Michael Schwekutsch, Wermelskirchen (DE); Theodor Gassmann, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 191 days.

(21) Appl. No.: 13/256,099

(22) PCT Filed: Mar. 12, 2010

(86) PCT No.: PCT/EP2010/053177
§ 371 (c)(1),
(2), (4) Date: Sep. 12, 2011

(87) PCT Pub. No.: WO2010/103101
PCT Pub. Date: Sep. 16, 2010

(65) Prior Publication Data
US 2012/0011952 A1      Jan. 19, 2012

(30) Foreign Application Priority Data
Mar. 12, 2009  (DE) .......................... 10 2009 012 463

(51) Int. Cl.
*F16H 37/06*        (2006.01)
(52) U.S. Cl.
USPC .................................. 74/665 GB; 74/665 H
(58) Field of Classification Search
USPC ....... 74/665 F, 665 GB, 665 H; 475/198, 206
See application file for complete search history.

(56) References Cited

U.S. PATENT DOCUMENTS

| 4,420,059 A | 12/1983 | Suzuki |
| 4,476,953 A * | 10/1984 | Hiraiwa ........................ 180/249 |
| 4,541,503 A * | 9/1985 | Akutagawa et al. .......... 180/249 |
| 4,582,160 A | 4/1986 | Weismann et al. |

(Continued)

FOREIGN PATENT DOCUMENTS

| EP | 0091406 A2 | 10/1983 |
| FR | 2588634 A1 | 4/1987 |
| JP | S6280357 A | 4/1987 |
| WO | WO-2010017882 A1 | 2/2010 |

OTHER PUBLICATIONS

English Translation of International Search Report for PCT/EP2010/053177 dated Sep. 20, 2011.

(Continued)

*Primary Examiner* — Ha D Ho
(74) *Attorney, Agent, or Firm* — Bejin VanOphem & Bieneman PLC

(57) ABSTRACT

An angle drive arrangement for a drive train comprises an input shaft and a shift clutch. The input shaft can be driven about a first rotational axis. The shift clutch is arranged coaxially with respect to the first rotational axis and has a clutch input part and a clutch output part which can be coupled to one another to transmit torque. The angle drive arrangement further includes an angle gearing with a crown gear, which is arranged coaxially to the first rotational axis, and a pinion, which is mounted about a second rotational axis and which is in meshing engagement with the crown gear. The second rotational axis is at a right angle to the first rotational axis. The crown gear is fixedly connected to an intermediate shaft mounted in a housing by first and second bearing mechanisms, which are arranged on the same side of the second rotational axis.

18 Claims, 6 Drawing Sheets

(56) References Cited

U.S. PATENT DOCUMENTS

| | | | |
|---|---|---|---|
| 4,643,045 A | * | 2/1987 | Katayama .................... 475/198 |
| 4,697,470 A | * | 10/1987 | Sasaki et al. ................. 475/206 |
| 4,745,819 A | | 5/1988 | Kano et al. |
| 4,867,001 A | | 9/1989 | Sasaki et al. |
| 7,010,995 B2 | | 3/2006 | Nett |
| 2011/0179906 A1 | * | 7/2011 | Juenemann et al. ......... 74/665 F |

OTHER PUBLICATIONS

PCT International Search Report for PCT/ep2010/053177 dated Jul. 23, 2010.

* cited by examiner

ANGLE DRIVE ASSEMBLY

CROSS REFERENCE TO RELATED APPLICATIONS

This application is a National Phase of International Application No. PCT/EP2010/053177, filed on Mar. 12, 2010, which claims priority to German Application No. 10 2009 012 463.2 filed on Mar. 12, 2009, which applications are hereby incorporated by reference in their entirety.

TECHNICAL FIELD

The disclosure relates to an angle drive assembly with an input shaft which is supported in a drive housing so as to be rotatable around a first axis, and with an output shaft which is supported in the drive housing so as to be rotatable around a second axis, wherein the second axis extends perpendicularly relative to the first axis. More particularly, angle drive assemblies of said type are used in motor vehicles with a transversely installed front engine. Such vehicle variants with a four-wheel drive are often derived from basic models which comprise a front-wheel drive only, with the angle drive assembly directly adjoining a differential drive of the front axle of the vehicle, with the input shaft of the angle drive assembly being firmly coupled to the differential carrier of the differential drive. The input shaft of the angle drive assembly is provided in the form of a hollow shaft through which there is guided one of the sideshafts of the differential drive.

BACKGROUND

From U.S. Pat. No. 4,420,059 there is known a drive assembly for a motor vehicle with a transfer case for distributing torque to the front wheels and rear wheels, respectively, as well as with a differential assembly and an angle drive. Between the differential assembly and the angle drive there is provided a clutch which is able to drivingly connect the differential carrier to the input gear of the angle drive. The input gear of the angle drive is supported by a bearing in a housing which is arranged so as to adjoin the clutch.

DE 4 745 819 proposes a front axle differential drive and a central differential drive for a four-wheel drive motor vehicle. The central differential is permanently driven by the engine via a ring gear housing. At the front axle differential there is provided a hydraulic multi-plate clutch which forms a locking mechanism for locking the central differential. In the locked condition, a differential movement between the front axle and the rear axle is blocked. In the open condition, a differential movement between the front axle and the rear axle can take place.

From EP 0 091 406 A2 there is known a drive assembly for a motor vehicle with a transversely fitted engine. The drive assembly comprises a planetary gear and an adjoining differential gear. There is provided a synchronising device for optionally locking and releasing the planetary gear.

DE 100 65 108 A1 proposes an angle drive with a drive housing which defines a first axis and a second axis extending radially relative thereto. The drive housing is annular in shape and comprises a set of sleeves in which the output shaft of the angle drive is rotatably supported.

Furthermore, it is known in motor vehicles with a permanently driven front axle and an optionally connectable rear axle, in the switched off condition, to uncouple the propeller shaft completely from the front axle and the rear axle, so that the propeller shaft stands still. In this way, any performance losses which would otherwise occur due to the torque-free running of the propeller shaft can be minimized, which, in turn, has an advantageous effect on the fuel consumption.

DE 10 2008 037 886 A1 proposes a drive assembly for a motor vehicle driven by a plurality of axles and having a permanently driven first driving axle and an optionally connectable second driving axle. The torque is transmitted to the second driving axle via a propeller shaft. For connecting and disconnecting the propeller shaft there are provided two clutches, one of which is arranged in the torque flow in front of the propeller shaft and the other one in the torque flow behind the propeller shaft.

Especially the front angle drive which has to be accommodated between the front axle differential and the propeller shaft behind and, respectively, underneath the internal combustion engine, comprises a very restricted installation space. Even more so, this applies to a driveline wherein the propeller shaft has to be suitable for being disconnected by a switchable clutch. The possibility of increasing the size of the angle drive is therefore limited by the restricted installation space.

SUMMARY

An angle drive assembly for the driveline of a motor vehicle with a permanently drivable first driving axle and an optionally drivable second driving axle is disclosed. The angle drive assembly comprises an input shaft, a clutch, and an angle drive. The input shaft is rotatingly drivable around a first axis of rotation A1. The clutch is arranged coaxially relative to the first axis of rotation A1 and comprises a clutch input part and a clutch output part. The clutch input part and the clutch output part can be coupled to one another for transmitting torque. The angle drive has a ring gear, which is arranged coaxially relative to the first axis of rotation A1, and a pinion, which is supported so as to be rotatable around a second axis of rotation A2 and which engages the ring gear. The second axis of rotation A2 is arranged at a right angle relative to the first axis of rotation A1. The ring gear is firmly connected to an intermediate shaft which, by first and second bearing mechanisms, is supported in a housing so as to be rotatable around the first axis of rotation A1. With reference to the second axis of rotation A2, the first and the second bearing mechanisms are arranged on the same side. According to one exemplary arrangement, the clutch and at least one of the first and second bearing mechanisms are arranged on different sides of the ring gear.

One advantage of the angle drive assembly disclosed herein, is that the angle drive assembly comprises a compact design and can therefore easily be accommodated in an existing space of motor vehicles with a transversely installed engine. Because both bearing mechanisms for supporting the intermediate shaft are arranged on the same side relative to a plane which is positioned perpendicularly on the first axis of rotation and contains the second axis of rotation, the radial installation space of the angle drive in the region of the clutch can be kept small. Achieving a symmetric and compact design is also facilitated in that the switchable clutch and at least one of the first and second bearing mechanisms are arranged on different sides of the ring gear. This measure leads to a first possibility in that the clutch is arranged on the one side of the ring gear, with the two bearing mechanisms being arranged on the other side of the ring gear. As a second possibility, the clutch and the one bearing mechanism are arranged on the one side of the ring gear, with the other bearing mechanism being arranged on the other side of the ring gear. It is advantageous if at least one of the first and the second bearing mechanisms are arranged on that side of the ring gear which faces away from the second axis of rotation.

The clutch allows the connection and disconnection of the angle drive which, regarding the torque flow, is located behind the clutch, which, in turn, has an advantageous effect on the performance losses. The input part of the clutch is drivingly connected to the input shaft, whereas the output part of the clutch is drivingly connected to the intermediate shaft. Overall, the angle drive assembly allows the angle drive and the propeller shaft to be disconnected, which eventually and advantageously affects the fuel consumption of the motor vehicle and which, furthermore, can easily be integrated into drive concepts with a transversely installed engine because of the compact design. According to one exemplary arrangement, the clutch can be controlled externally. Control is may be effected by an electronic control unit, more particularly, as a function of the driving dynamics of the motor vehicle.

According to one exemplary embodiment, it is proposed that, with reference to the ring gear, the first and second bearing mechanisms are arranged on the same side. This is arrangement is advantageous with respect to the radial space conditions in the region of the clutch because, in this region, there is no need for additional bearing mechanisms. In this embodiment, the first bearing mechanism is arranged so as to axially adjoin the ring gear, and the second bearing mechanism is arranged in an end portion of the intermediate shaft. In this way, the tilting moments acting on the intermediate shaft due to the transmission of torque between the ring gear and the pinion are well supported. In one particular exemplary arrangement, rolling-contact bearings are employed, and more particularly, tapered roller bearings, as the first and second bearing mechansims, with other types of bearing, mechanism, such as friction bearings not being excluded. If tapered roller bearings are used—to ensure the tilting moments are well supported—these should be positioned in an O-arrangement. More specifically, O-arrangement means that, in a longitudinal section, the force application lines between the first and the second bearing mechanisms extend in an approximately O-like way.

According to another exemplary embodiment, the first bearing mechanism is axially arranged between the clutch output part and the ring gear, and the second bearing mechanism, relative to the ring gear, is arranged on the side opposed to the first bearing mechanism. This embodiment is advantageous in that the supporting conditions for the tilting moments are improved even further. In addition, the angle drive assembly designed in this way comprises a short axial length because only one bearing unit has to be accommodated on the side facing away from the ring gear. In one exemplary arrangement, the housing—if viewed in a section through the first and the second axis of rotation—comprises a web in which the first bearing mechanism is accommodated. In this way it is ensured that the forces acting on the ring gear and the intermediate shaft are satisfactorily introduced into the housing. In the above-mentioned embodiment, the first and second bearing mechanisms may be provided in the form of tapered roller bearings installed preferably in an X-arrangement. The term "X-arrangement" means that, in a longitudinal section, the force application lines acting between the inner bearing race and the outer bearing race of the first and second bearing mechanisms extend in an approximately X-like way. It is understood that other types of bearing mechanisms such as friction bearings or other types of rolling-contact bearings can also be used.

The intermediate shaft can also be rotatably supported directly in the housing—this applies to the above-mentioned embodiments. Alternatively, the intermediate shaft can also be supported indirectly in the housing, i.e. via a bearing bushing which is firmly connected to the housing. More particularly, in one exemplary arrangement, it is proposed that the intermediate shaft, including the ring gear, the first and the second bearing mechanisms and the bearing bushing, form a pre-assembled unit. Said pre-assembled unit is slid into a corresponding lateral aperture of the housing and firmly connected thereto, for instance by threaded connections.

The housing may be configured so as to comprise two semi-shells which are joined in a plane extending parallel to the first axis of rotation. This includes the possibility that the parting plane contains the first axis of rotation. For connecting the two semi-shells, common connecting devices can be used, such as screws. Providing the housing in the form of two semi-shells whose parting plane extends parallel to the first axis rotation is advantageous in that it provides a particularly compact installation space. A flange which radially increases the installation space in a transverse plane is not required. In a side view of the angle drive assembly, the parting plane is may be positioned such that an angle enclosed between the parting plane and the second axis of rotation ranges between 45° and 90°. This results in a particularly compact design of the angle drive assembly, so that this can easily be incorporated into the installation space of motor vehicles with a transversely fitted engine.

In one exemplary arrangement, the housing comprises a sleeve projection in which the pinion is rotatably supported so as to extend coaxially relative to the second axis of rotation, with the pinion being rotatably supported by third and fourth bearing mechanisms. The third and fourth bearing mechanisms may be provided in the form of tapered rolling bearings positioned more particularly in an O-arrangement. As already mentioned above, other types of bearing mechanisms are not excluded. As far as the support of the pinion and of the pinion shaft is concerned, these, according to a first possibility, can be supported directly in the housing or, alternatively, in a suitable bearing bushing which has to be firmly connected to the housing. In the latter embodiment, the pinion shaft, the third and fourth bearing mechanisms and the bearing bushing form a pre-assembled unit which is inserted into a suitable aperture extending coaxially relative to the second axis of rotation and which is secured thereto.

According to another embodiment, which may be incorporated with all of the above-mentioned embodiments, the clutch comprises form-engaging mechanisms for transmitting torque from the clutch input part to the clutch output part. A clutch in this context is a clutch which permits the transmission of torque between the input shaft and the output shaft of the angle drive assembly to be interrupted and re-established. The form-engagement mechanisms are mechanisms according to which the transmission of torque between the clutch input part and the clutch output part is achieved by form-locking engagement between said parts. Examples for a form-locking clutch are toothed clutches or dog clutches.

According to a possible further embodiment, the clutch can comprise a synchronising device for synchronising the speed between the clutch input part and the clutch output part. By balancing the speed of the clutch parts prior to the switching process, the actual switching process becomes "softer", i.e. there does not occur any undesirable switching noise. For example, the synchronising device can be a friction clutch or a pair of friction faces, which, more particularly, are conical.

BRIEF DESCRIPTION OF THE DRAWINGS

Exemplary embodiments of the disclosure will be explained below with reference to the drawings wherein.

DETAILED DESCRIPTION

Figure 1:
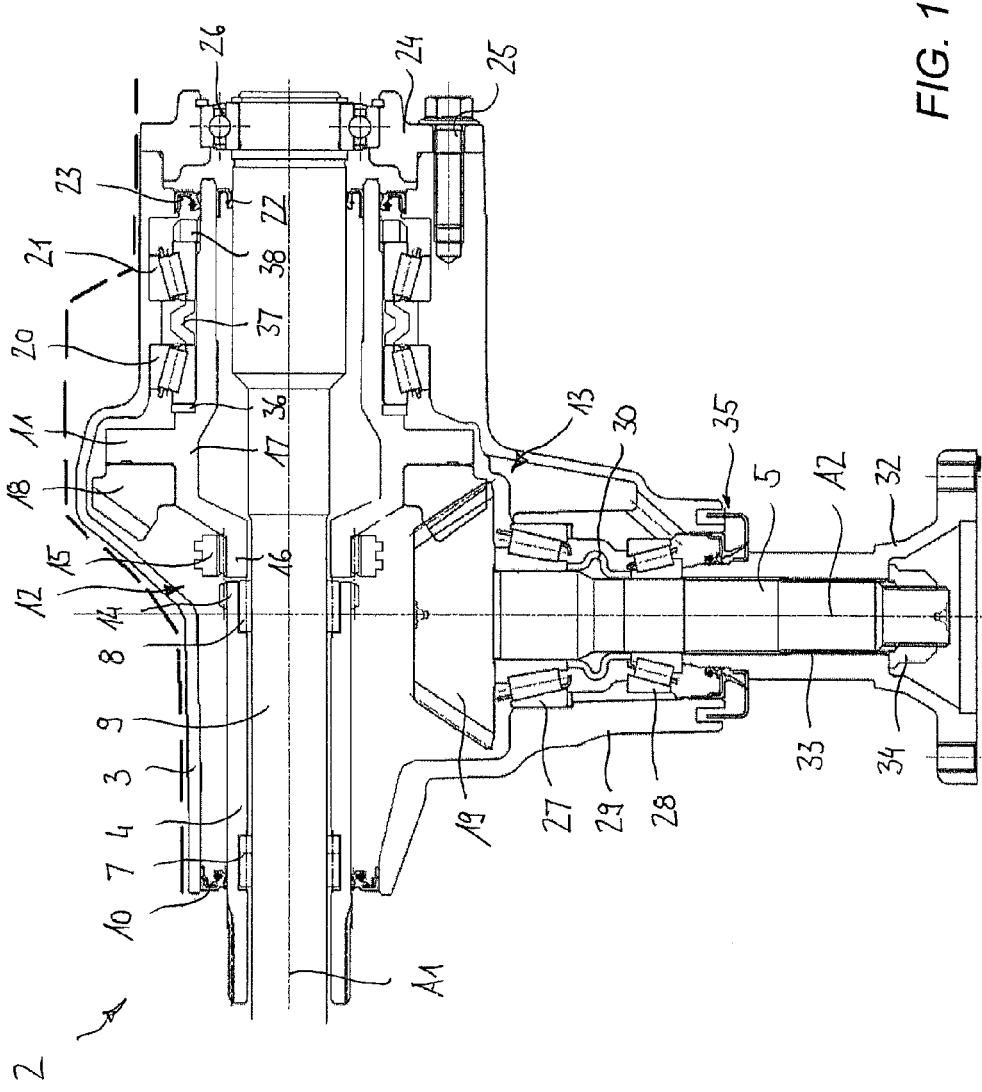
FIG. 1 shows an exemplary angle drive assembly in a first embodiment in a sectional view through the input shaft and the output shaft.

FIGS. 1 to 6 will initially be described jointly below. The angle drive assembly 2 comprises a housing 3, an input shaft 4, which is supported in the housing 3 so as to be rotatable around a first axis of rotation A1, and an output shaft 5 which is supported in the housing 3 so as to be rotatable around a second axis of rotation A2. The second axis of rotation A2 intersects the first axis of rotation A1 with a distance at a right angle. The housing 3 comprises a connecting flange (not illustrated) by which the angle drive assembly can be bolted to a stationary component, more particularly to a differential drive or an engine component. The input shaft 4 is provided in the form of a hollow shaft and, at its free end, comprises shaft teeth for providing a rotationally fixed connection with a drive component (not illustrated), more particularly the differential carrier of the differential drive.

It can be seen that the input shaft 4 is supported via two bearings 7, 8 on a sideshaft so as to be rotatable around the axis of rotation A1. For transmitting torque, the sideshaft 9 is connected in a rotationally fixed way to one of the two sideshaft gears of the differential drive. It is understood that the input shaft 4 could also be supported in a rotationally fixed way relative to the drive housing 3. The annular chamber formed between the housing 3 and the input shaft 4 is sealed by a seal 10, more particularly a radial shaft sealing ring. The sideshaft 9 is guided through the input shaft 4 provided in the form of a hollow shaft and through the intermediate shaft 17 provided in the form of a hollow shaft. More specifically, the sideshaft 9, the input shaft 4 and the intermediate shaft 17 are arranged coaxially relative to one another and, respectively, to the axis of rotation A1.

Furthermore, the angle drive assembly comprises a clutch 12 and an angle drive 13 following the clutch 12 in the torque flow. In principle, the clutch 12 can be any type of clutch which allows the connection and disconnection of the torque flow between the input shaft 4 and the output shaft 5. In one particular arrangement, a form-locking clutch is utilized because it requires a relatively small installation space. A form-locking clutch in this context refers to a clutch wherein the transmission of torque is effected by the engagement of the two clutch parts. Examples of form-locking clutches include dog clutches or toothed clutches. In the present exemplary embodiment, the clutch is provided in the form of a toothed clutch which, at the clutch input part 14, comprises a first toothing which, by a switching muff 15 for the transmission of torque, can be connected in a rotationally fixed way to a corresponding second toothing at the clutch output part 16. The clutch 12 is opened and closed by axially displacing the switching muff 15.

In a structurally modified form, the clutch 12 can comprise a synchronising device which, before the clutch input 14 is connected to the clutch output part 16, permits the speeds between the two components to be adjusted to one another. After the clutch input part 14 has been synchronised with the clutch output part 16, the switching process takes place. The clutch 12 is controlled, as required, as a function of the driving dynamics of the motor vehicle by an electronic control unit.

It can be seen that the clutch input part 14 is produced so as to be integral with the input shaft 4 of the angle drive assembly 2. The clutch output part 16 is firmly connected to an intermediate shaft 17. In one exemplary arrangement, the clutch output part 16 and the intermediate shaft 17 are produced so as to form one piece. The intermediate shaft 17 is provided in the form of a hollow shaft and comprises a flange 11 to which there is secured the ring gear 18 of the angle drive 13, for instance by a bolted connection or welding. The intermediate shaft 17 is rotatably supported in the housing 3 so as to extend coaxially relative to the axis of rotation A1. The annular space formed between the intermediate shaft 17 and the sideshaft 9 is sealed by a seal 22, with the seal 22 more particularly being provided in the form of a radial shaft sealing ring. The annular space formed between the intermediate shaft 17 and the housing 3 is also sealed by a seal 23. In one exemplary arrangement, seal 23 is provided in the form of a radial shaft sealing ring.

In addition to the ring gear 18, the angle drive 13 comprises a pinion 19 which engages the ring gear 18. The pinion 19 and the ring gear 18 each comprise a tapered or conical toothing. The pinion 19 is firmly connected to the output shaft 5, for instance by welding. However, it is also conceivable for the pinion 19 and the output shaft 5 to be provided in one piece in the form of a pinion shaft. The output shaft 5 is at least indirectly supported in a sleeve projection 29 of the housing 3 by third and fourth bearing mechanisms 27, 28, so as to be rotatable around the axis of rotation A2. In principle, the third and fourth bearing mechanisms 27, 28 can be provided in any form. It is particularly advantageous to use tapered roller bearings which, in the present embodiment, are configured in an O-assembly. The O-assembly results in good supporting conditions for the tilting moments acting on the pinion shaft. Between the inner bearing races of the two bearings 27, 28 there is provided a sleeve 30 for pretensioning the bearings.

For transmitting torque from the output shaft 5 to the propeller shaft (not illustrated) of the motor vehicle, there is provided an attaching flange 32 which, by shaft teeth 33, is connected to the output shaft 5 in a rotationally fixed way. For axially tensioning the connecting flange 32 relative to the output shaft 5 and for simultaneously axially pretensioning the bearings 27, 28, there is provided a threaded nut 34 which is threaded on to a free end of the output shaft 5. The attaching flange 32, in turn, is axially supported against the inner bearing race of the fourth bearing 28. The annular space formed between the output shaft 5 and the attaching flange 32 on the one hand and the output shaft 5 and the housing 3 on the other hand is sealed by a sealing device 35 to prevent dirt from entering and lubricant from escaping. The sealing device 35 comprises a contact-free seal and a contacting soft seal.

Figure 2:
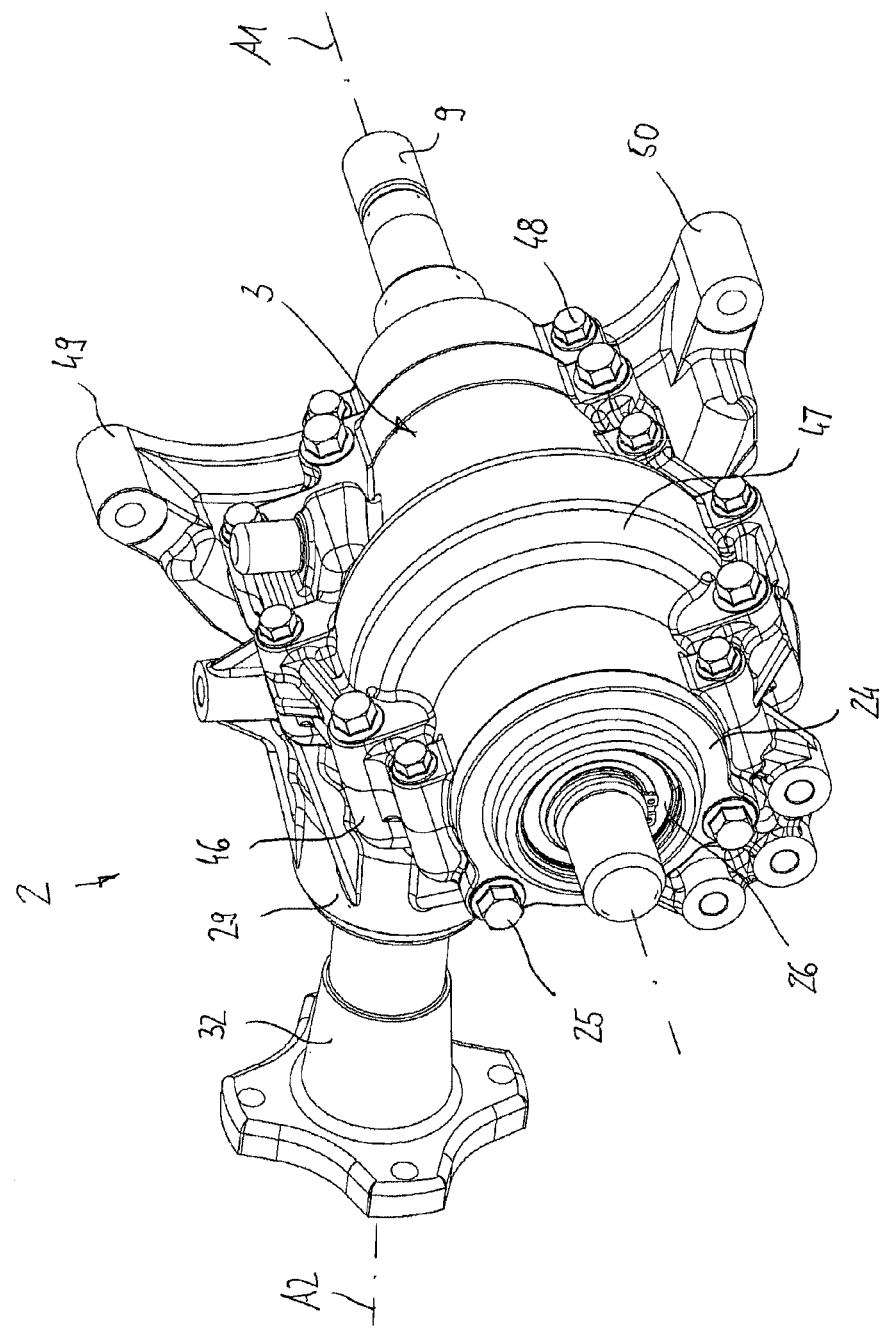
FIG. 2 shows the angle drive assembly according to FIG. 1 in a perspective view.

Referring to FIG. 2, the housing 3 may be configured with two semi-shells 46, 47, with the separating plane E containing the first axis of rotation A1. The separating plane and the second axis of rotation A2 enclose an angle α which may range between 45° and 90°, and more particularly, approximately 70°±10°. As a result, the installation space required towards the engine is very small. The two semi-shells 46, 47 may be connected to one another by bolts 48, but other connecting methods such as welding are not excluded. It is possible to identify further attaching flanges 49, 50 which serve to bolt together the housing 3 and a stationary component, more particularly the differential drive.

A characteristic feature which is common to all the embodiments illustrated herein includes that the first and the second bearing mechanisms 20, 21, which serve to support the intermediate shaft 17 around the axis of rotation A1, are arranged on the same side with reference to the axis of rotation A2. Furthermore, it can be seen that the clutch 12 and at least one of the first and second bearing mechanisms 20, 21 are arranged on different sides of the ring gear 18, with at least one of the two first and second bearing mechanisms 20, 21 being arranged on that side of the ring gear 18 which faces away from the second axis of rotation A2, respectively on that side in whose direction the cone angle of the toothing of the ring gear 18 opens.

As a result of said features, there is achieved a compact design in the region of the clutch 12, which has an advantageous effect on the space requirements and thus on integrating the components under the existing space conditions.

Below, the different features of the individual embodiments will be explained.

In the embodiments according to FIG. 1 and FIG. 2 respectively, both the first bearing mechanism 20 and the second bearing mechanism 21 are arranged on the same side with reference to a plane extending through the ring gear 18. The clutch 12 and the two bearing mechanisms 20, 21 are arranged on different sides of the ring gear 18. In principle, the first and the second bearing mechanisms 20, 21 could be of any type. From the point of view of supporting the tilting moments, it is particularly advantageous to use tapered roller bearings which may be arranged in an O-arrangement. It can be seen that the inner bearing race of the first bearing mechanism 20 is axially supported against a shoulder of the intermediate shaft 17 via a spacing ring 36. For axially pretensioning the two inner bearing races relative to one another, there is provided a sleeve 37 which is positioned axially between the two inner bearing races. The axial pretension is achieved by a threaded nut 38 which is threaded on to a corresponding thread at the end of the intermediate shaft 17. The outer bearing races of the two bearing mechanisms 20, 21 are axially supported relative to a corresponding shoulder of the housing 3.

In the present embodiment, a cover 24 is provided at that end of the housing 3 which is distant from the differential drive. More particular, the cover 24 can be connected to the housing 3 by threaded connections 25. At its end distant from the differential drive, the sideshaft 9 is rotatably supported coaxially relative to the axis of rotation A1 in the cover 24 by a bearing 26. The output shaft 5 is rotatably supported directly in the sleeve projection 29 of the drive housing 3.

Figure 3:
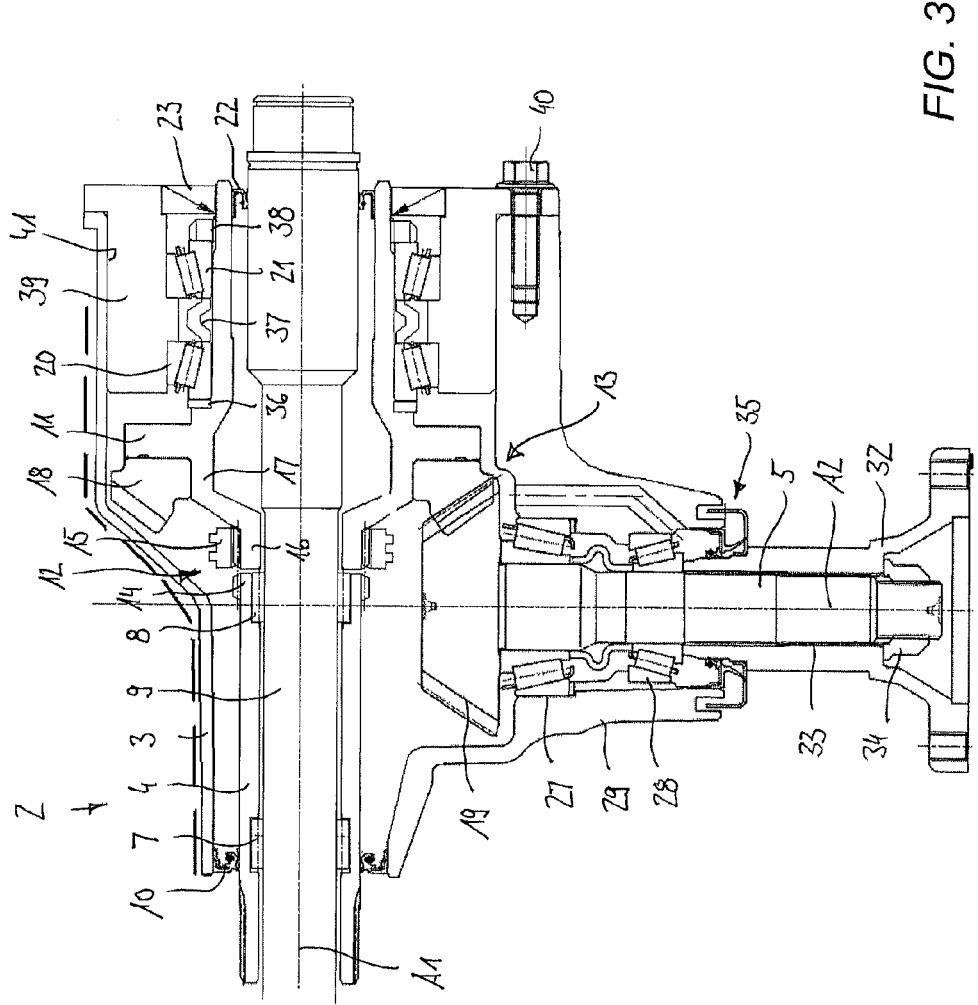
FIG. 3 shows an exemplary angle drive assembly in a second embodiment in a sectional view through the input shaft and the output shaft.

The embodiment according to FIG. 3 largely corresponds to that shown in FIG. 1 and FIG. 2 respectively, so that, as far as common features are concerned, reference can be made to the above description, with identical components and those corresponding to one another having been given the same reference numbers.

The only difference between the embodiments of FIGS. 1 and 2 and the embodiment in FIG. 3, is that the intermediate shaft 17 is rotatably supported in a bushing 39 by the first and second bearing mechanisms 20, 21. The assembly includes the intermediate shaft 17 with the ring gear 18, the spacing disc 36, the first and second bearing mechanisms 20, 21 with the spacing sleeve 37 and the threaded nut 38 and with the bushing 39 constituting one unit. Said unit is inserted into a suitable lateral aperture 41 of the housing 3. Then the bushing 39 is first connected to the housing 3. In one exemplary arrangement, a plurality of circumferentially distributed bolts 40 connects the bushing 39 and the housing 3.

Figure 4:
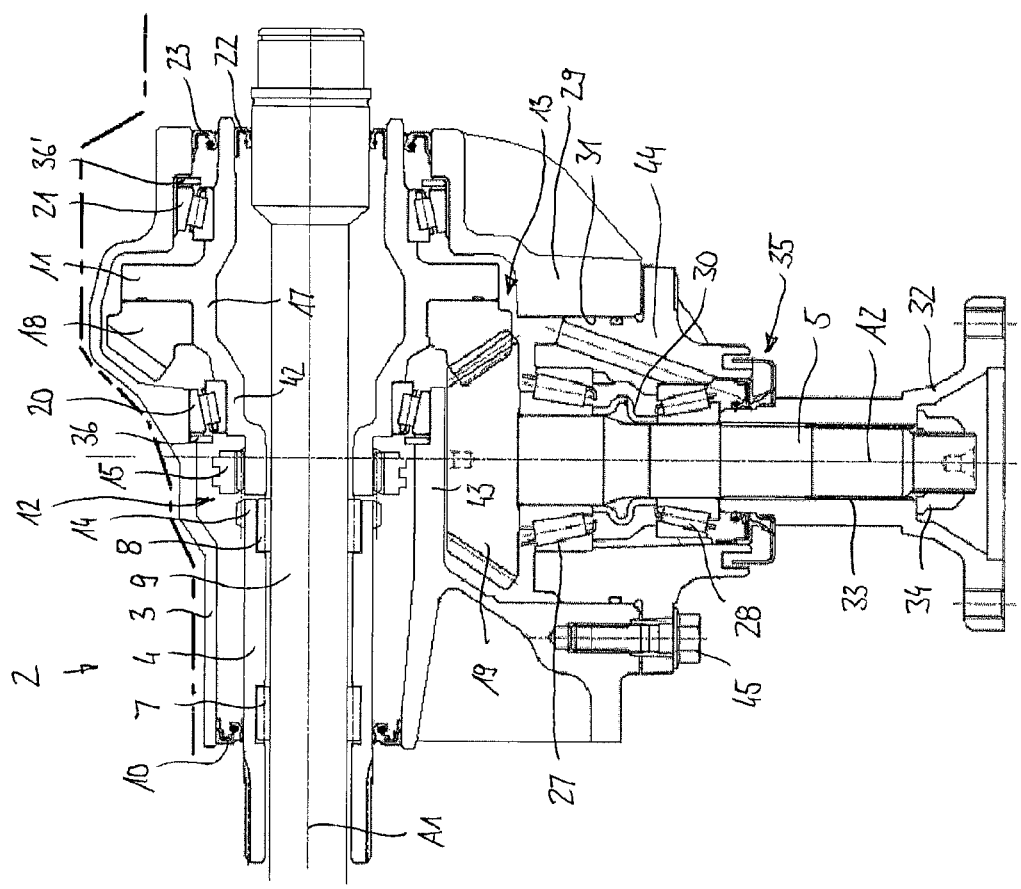
FIG. 4 shows an exemplary angle drive assembly in a third embodiment in a sectional view through the input shaft and the output shaft.

FIG. 4 shows an inventive angle drive assembly in a further embodiment which largely corresponds to the embodiments shown in FIG. 1 and FIG. 2 respectively. To that extent, as far as common features are concerned, reference is made to the above description, with identical components and those corresponding to one another having been given the same reference numbers.

A feature of the embodiment shown in FIG. 4 includes that the first and second bearing mechanisms 20, 21 are arranged on different sides with reference to the ring gear 18. The first bearing mechanism 20 and the clutch 12 are arranged on the same side relative to the ring gear 18, whereas the second bearing mechanism 21 is arranged on the other side of the ring gear 18, which side can also be referred to as the reverse side. The first bearing mechanism 20 is arranged axially between the clutch output part 16 and the ring gear 18, on a stepped portion 42 of the intermediate shaft 17. The outer bearing race of the first bearing mechanism 20 is supported against an appropriate shoulder of the housing 3, with a spacing disc 36 being arranged between the shoulder and the outer bearing race. In the region provided between the sideshaft 9 and the pinion 19, the housing 3 comprises a web 43 for accommodating the first bearing mechanism 20. The two sets of bearing mechanisms 20, 21 are provided in the form of tapered roller bearings which are arranged in an X-arrangement. As the two sets of bearing mechanisms 20, 21 are arranged on different sides of the ring gear 18, the present angle drive assembly, overall, comprises a shorter axial installation length. In the present embodiment, there is no provision for a cover on that side of the angle drive assembly which is opposed to the differential.

A further difference as compared to the embodiment according to FIG. 1 includes that the present embodiment comprises a bushing 44 in which the output shaft 5 is rotatably supported on the axis of rotation A2. The pinion 19 with the output shaft 5, the third and fourth bearing mechanisms 27, 28 with the sleeve 30 arranged therebetween, the attaching flange 32 with the nut 34 and the bushing 44 form one pre-assembled unit. Said pre-assembled unit is then inserted into a suitable bore 31 so as to extend coaxially relative to the axis of rotation A2, with the toothing of the pinion 19 engaging the counter toothing of the ring gear 18. Subsequently, the bushing 44 is firmly connected to the housing 3. In one exemplary arrangement, a plurality of circumferentially distributed bolts 45 connect the bushing 44 to the housing 3.

Figure 5:
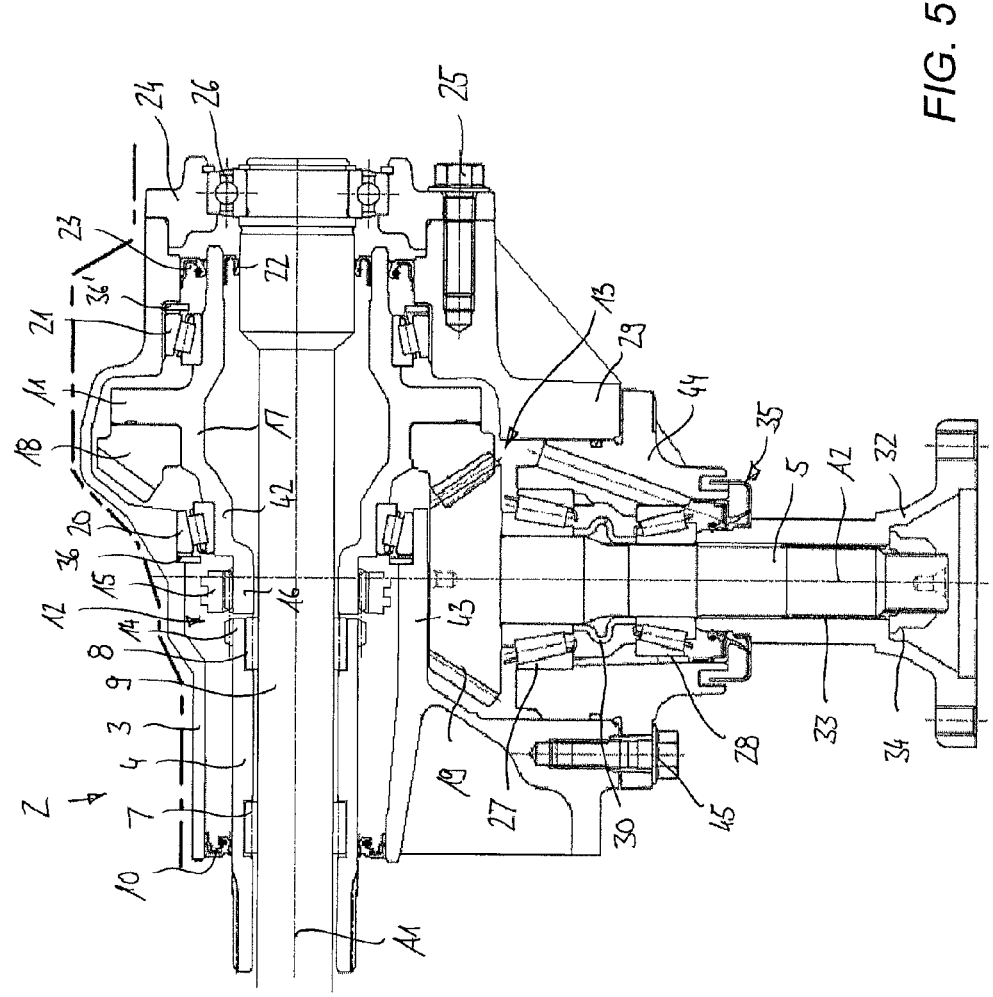
FIG. 5 shows an exemplary angle drive assembly in a fourth embodiment in a sectional view through the input shaft and the output shaft.

FIG. 5 shows an inventive angle drive assembly in a further embodiment which largely corresponds to that shown in FIG. 4. To that extent, as far as common features are concerned, reference is made to the above description, with identical components and components corresponding to one another having been given the same reference numbers.

The only difference between the embodiments shown in FIGS. 4 and 5 include that in the embodiment of FIG. 5, the side of the angle drive assembly 2, which side faces away from the differential drive, is closed by a cover 24—as in the embodiment according to FIG. 1 to the description of which reference is also made.

Figure 6:
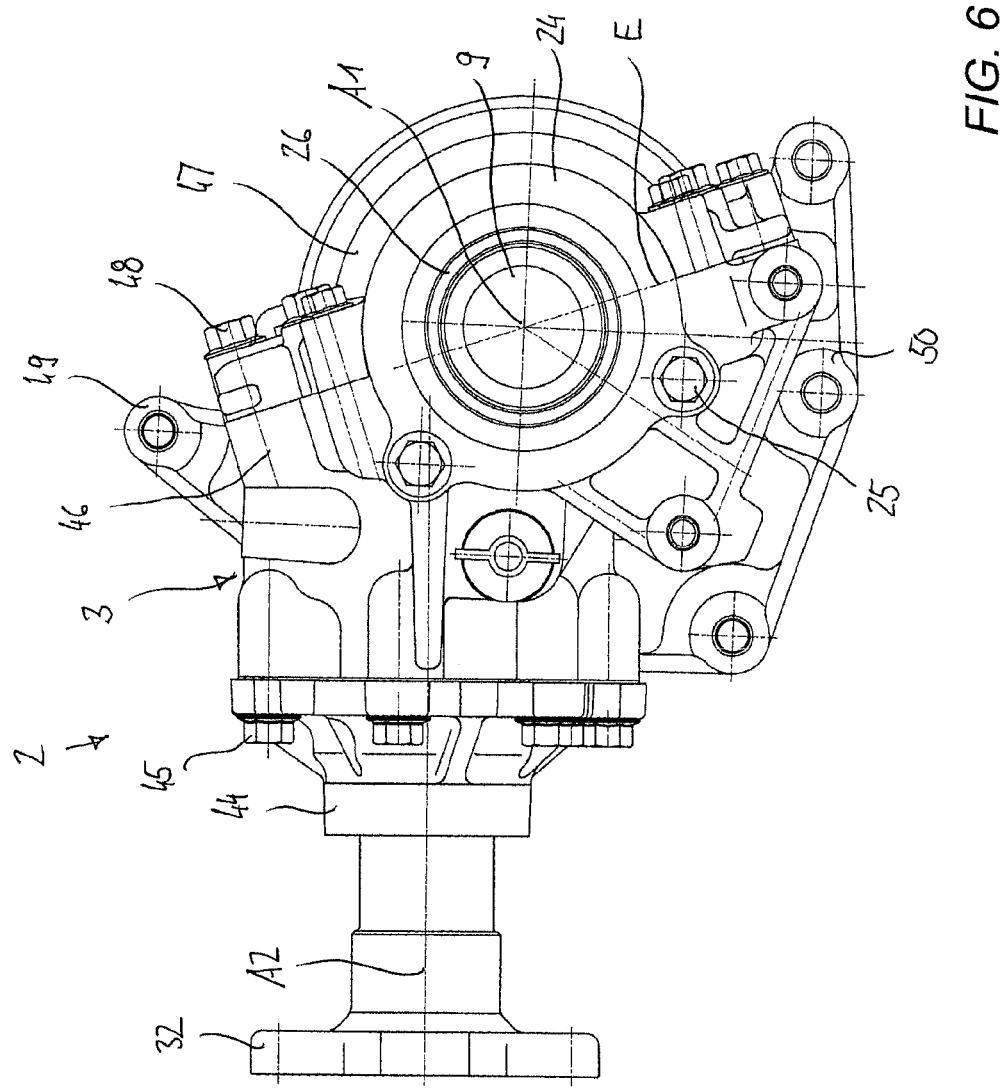
FIG. 6 shows the angle drive assembly according to FIG. 5 in an axial view.

FIG. 6 shows the angle drive assembly according to FIG. 5 in an axial view. It can be seen that the second axis of rotation A2 crosses the first axle of rotation A1 at a right angle at a distance. Furthermore, it is possible to identify the bushing 44 which is threaded to the housing 3 by bolts 45.

The invention claimed is:

1. An angle drive assembly for the driveline of a motor vehicle with a permanently drivable first driving axle and a connectable second driving axle, comprising
    a sideshaft with a first axis of rotation;
    an input shaft which is arranged coaxially relative to the sideshaft and which is rotatably drivable around the first axis of rotation;
    an intermediate shaft which, by first and second bearing mechanisms, is supported in a housing so as to be rotatable around the first axis of rotation;
    a clutch which is arranged coaxially relative to the first axis of rotation, wherein the clutch comprises a clutch input part which is connected to the input shaft, and a clutch output part which is connected to the intermediate shaft, wherein the clutch input part and the clutch output part can be coupled to one another for optionally transmitting torque to the second driving axle, wherein in a closed condition of the clutch, the second driving axle is driven, and in an open condition of the clutch, the second driving axle is non-driven; and
    an angle drive with a ring gear which is firmly connected to the intermediate shaft and which is arranged coaxially relative to the first axis of rotation, and with a pinion which is supported so as to be rotatable around a second axis of rotation and which engages the ring gear, wherein the second axis of rotation is arranged at a right angle relative to the first axis of rotation;
    wherein, with reference to the second axis of rotation, the first and the second bearing mechanisms are arranged on the same side and
    wherein the clutch and at least one of the first and second bearing mechanisms are arranged on different sides of the ring gear.

2. An angle drive assembly according to claim 1, wherein the first and the second bearing mechanisms are received in a bearing bushing which is inserted into the housing and is firmly connected thereto.

3. An angle drive assembly according to claim 2, wherein the intermediate shaft, the first and the second bearing mechanisms, and the bearing bushing form a pre-assembled unit.

4. An angle drive assembly according to claim 1, wherein the first and the second bearing mechanisms are provided in form of tapered roller bearings.

5. An angle drive assembly according to claim 1, wherein the first bearing mechanism is arranged between the clutch output part and the ring gear and that, with reference to the ring gear, the second bearing mechanism is arranged on the side located opposite the first bearing mechanism.

6. An angle drive assembly according to claim 1, wherein the housing comprises two semi-shells which are joined in a plane which extends parallel to the first axis of rotation or which contains the first axis of rotation.

7. An angle drive assembly according to claim 6, wherein an angle enclosed between the plane and the second axis of rotation ranges between 45° and 90°.

8. An angle drive assembly according to claim 1, wherein the housing comprises a sleeve projection in which the pinion is rotatably supported.

9. An angle drive assembly according to claim 1, wherein the housing—if viewed in a longitudinal section—comprises a web in which the first bearing mechanism is received.

10. An angle drive assembly according to claim 5, wherein the first and the second bearing mechanisms are provided in the form of tapered roller bearings.

11. An angle drive assembly according to claim 1, wherein the pinion is rotatably supported by third and fourth bearing mechanisms on the second axis of rotation.

12. An angle drive assembly according to claim 11, wherein the third and fourth bearing mechanisms are provided in the form of tapered roller bearings.

13. An angle drive assembly according to claim 11, wherein the third and fourth bearing mechanisms are received in a bearing bushing which is inserted into the housing and firmly connected thereto.

14. An angle drive assembly according to claim 13, wherein the pinion, the third and fourth bearing mechanism and the bearing bushing form a pre-assembled unit.

15. An angle drive assembly according to claim 1, wherein the clutch comprises form-engaging mechanisms for transmitting torque from the clutch input part to the clutch output part.

16. An angle drive assembly according to claim 1, wherein the clutch comprises a synchronising device for synchronising the speed between the clutch input part and the clutch output part prior to the gear changing operation.

17. An angle drive assembly according to claim 1, wherein at least one of the first and second bearing mechanisms is arranged on one side of the ring gear, which side faces away from the second axis of rotation.

18. An angle drive assembly for the driveline of a motor vehicle with a permanently drivable first driving axle and a connectable second driving axle, comprising
    a sideshaft with a first axis of rotation;
    an input shaft which is arranged coaxially relative to the sideshaft and which is rotatably drivable around the first axis of rotation;
    an intermediate shaft which, by first and second bearing mechanisms, is supported in a housing so as to be rotatable around the first axis of rotation;
    a clutch which is arranged coaxially relative to the first axis of rotation, wherein the clutch comprises a clutch input part which is connected to the input shaft, and a clutch output part which is connected to the intermediate shaft, wherein the clutch input part and the clutch output part can be coupled to one another for transmitting torque to the second driving axle; and
    an angle drive with a ring gear which is firmly connected to the intermediate shaft and which is arranged coaxially relative to the first axis of rotation, and with a pinion which is supported so as to be rotatable around a second axis of rotation and which engages the ring gear, wherein the second axis of rotation is arranged at a right angle relative to the first axis of rotation;
    wherein, with reference to the second axis of rotation, the first and the second bearing mechanisms are arranged on the same side; and
    wherein the clutch and at least one of the first and second bearing mechanisms are arranged on different sides of the ring gear;
    wherein, with reference to the ring gear, the first and the second bearing mechanisms are arranged on the same side.

* * * * *